United States Patent
Miyata et al.

(10) Patent No.: US 6,821,445 B2
(45) Date of Patent: Nov. 23, 2004

(54) RAINWATER-TREATING APPARATUS IN COMBINED SEWER SYSTEM AND BACKWASHING METHOD THEREFOR

(75) Inventors: Atsushi Miyata, Obu (JP); Yoshihiko Nakayama, Handa (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/343,179
(22) PCT Filed: Apr. 4, 2002
(86) PCT No.: PCT/JP02/03404
§ 371 (c)(1),
(2), (4) Date: Jan. 28, 2003
(87) PCT Pub. No.: WO02/081050
PCT Pub. Date: Oct. 17, 2002

(65) Prior Publication Data
US 2003/0106859 A1 Jun. 12, 2003

(51) Int. Cl.[7] .......................... B01D 37/00; B01D 24/26
(52) U.S. Cl. ................. 210/793; 210/254; 210/257.1; 210/264; 210/265; 210/275; 210/433.1; 210/919; 210/920; 210/921
(58) Field of Search ................................ 210/793, 275, 210/264–265, 150–151, 615–618, 170, 747, 254–255, 257.1, 433.1, 919, 920, 921

(56) References Cited

FOREIGN PATENT DOCUMENTS

| JP | 62-24910 | 2/1987 |
|---|---|---|
| JP | 5-317841 | 12/1993 |
| JP | 6-79107 | 3/1994 |

*Primary Examiner*—Robert James Popovics
(74) *Attorney, Agent, or Firm*—Parkhurst & Wendel, L.L.P.

(57) ABSTRACT

The present invention is aimed at treating rainwater in a combined sewer system, while enabling removal of a majority of pollution substances even if a large amount of entering rainwater. The invention relates to a rainwater-treating apparatus in a combined sewer system, said apparatus comprising a plurality of upward flow type high-speed filter vessels each having a layer of a floating filter medium, a common treated water vessel which is located at upper faces of said high-speed filter vessels and is adapted to collect treated water from the high-speed filter vessels, a used wash water vessel which collects used wash water from said high-speed filter vessels, a rainwater inflow channel for distributing the entering rainwater into upper portions of the high speed filter vessels, and rainwater inflow portions for flowing downwardly the rainwater distributed from the rainwater inflow channel under the respective floating filter media of the filter vessels.

16 Claims, 6 Drawing Sheets

RAINWATER-TREATING APPARATUS IN COMBINED SEWER SYSTEM AND BACKWASHING METHOD THEREFOR

TECHNICAL FIELD

The present invention relates to a rainwater-treating apparatus in a combined sewer system into which wastewater and storm water are combined as a sewer in a confluent flow. The invention also relates to a method for back washing said apparatus. The invention further relates to a sewer-treating system which uses the sewer-treating apparatus in raining (hereinafter referred to as "rainwater-treating apparatus). In the present application, the term "rainwater" is used to mean the sewer which is the combined flow of the storm water and the wastewater during raining, therefore "rainwater" as a common meaning is discriminated from "storm water".

BACKGROUND

In the combined sewer system for the wastewater and storm water, the flow amount largely varies between non-rainy weather and rainfall weather. In the combined flow type sewer-treating plant, the maximum inflow water amount per hour into the sewer-treating plant during raining is controlled to three times 3Q as much as a design water amount Q that is the maximum inflow water amount per hour when there is no storm water. An ordinary treatment can be effected in the same manner as in non-rainy weather if the water amount does not exceed Q. However, if it is more than Q and not more than 3Q, this exceeds the ordinary treating power of the reaction vessel in the treating plant, and therefore a simple treatment is effected in which the rainwater is subjected to settlement treatment in the first sedimentation basin and then discharged. Further, if the water amount increases and exceeds 3Q, the stormwater is actually discharged directly to a river, etc. without being treated at all.

Therefore, when the water amount increases over Q, almost all pollution substances are discharged to the river, etc. as they are. This results in pollution of the environment. In particular, since the combined sewer systems are employed particularly in many big cities in which the sewer systems have been propagated in early days, the above environmental problems have become manifesting with the development of waterfronts.

To cope with such problems, high-speed rainwater filter apparatuses having layers of floating filter media have been now being positively developed. However, since the thickness of the filter media in the high-speed rainwater filter apparatuses now under investigation is not less than 2 m, and filter media outflow-preventing screens are necessary at lower portions thereof. Alternatively, the apparatus is equipped with a flocculant-feeding mechanism to increase the treating efficiency. In actual application, since a civil equipment, such as an existing first sedimentation basin, having a water depth of 2.5 to 4 m cannot be used, the above filter apparatus is a technique that is required to be newly constructed from a civil structure, resulting in a huge cost required.

The present invention solves the above problems of the prior art, and has been made to provide a rainwater-treating apparatus in the combined sewer system which apparatus can remove a majority of the pollution substances even if rainwater exceeding Q enters or much rainwater exceeding 3Q enter. Further, the present invention provides a rainwater-treating apparatus which can be installed inexpensively by easily modifying an existing first sedimentation basin as well as a method for back washing the apparatus. Other object of the present invention is to provide the rainwater-treating apparatus in the combined sewer system and the back washing method therefor, enabling the accomplishment of the above object with almost no need of maintenance.

DISCLOSURE OF THE INVENTION

The present invention is made to solve the above problems, and its first aspect is to provide a rainwater-treating apparatus in a combined sewer system, said apparatus comprising a plurality of upward flow type high-speed filter vessels each having a layer of a floating filter medium, a common treated water vessel which is located at upper faces of said high-speed filter vessels and is adapted to collect treated water from the high-speed filter vessels, a used wash water vessel which collects used wash water from said high-speed filter vessels, a rainwater inflow channel for distributing the entering rainwater into upper portions of the high speed filter vessels, and rainwater inflow portions for flowing downwardly the rainwater distributed from the rainwater inflow channel under the respective floating filter media of the filter vessels.

The rainwater-treating apparatus according to the present invention can be constructed by partitioning a first sedimentation basin in the conventional combined flow type sewer-treating plant.

A second aspect of the present invention is to provide a sewer-treating system in a combined flow type sewer-treating line, said system comprising a first sewer-treating section and a second sewer-treating section, said first sewer-treating section comprising a sand-settling basin for receiving sewer, a first sedimentation basin provided downstream of the sand-settling basin and a reacting vessel provided downstream of the sedimentation basin, said second sewer-treating section being provided downstream of the sand-settling basin and comprising a plurality of upward flow type high-speed filter vessels each having a layer of a floating filter medium, a common treated water vessel which is located at upper faces of said high-speed filter vessels and is adapted to collect treated water from the high-speed filter vessels, a used wash water vessel which collects used wash water from said high-speed filter vessels, a rainwater inflow channel for distributing the entering rainwater into upper portions of the high speed filter vessels, and rainwater inflow portions for flowing downwardly the rainwater distributed from the rainwater inflow channel under the respective floating filter media of the filter vessels, wherein when an amount of sewer to be treated is not more than a preset design water amount, the sewer is treated in the first sewer-treating section, whereas when the amount of the sewer to be treated is more than the preset design water amount, the sewer treatment is effected in the first sewer-treating section and in addition a portion of the sewer exceeding the preset design water amount is treated in the second sewer-treating section.

The rainwater-treating apparatus can be installed by modifying the existing first sedimentation basin having a height of 2.5–4 m, for example. The reason is as follows. That is, finer filter medium particles are used as compared with the conventional apparatus, the thickness of the floating filter medium layer can be made as thin as around 0.5 to 1 m that is less than 2 m, no lower screen is required, and that an equipment for adding a flocculant is necessary. Consequently, the compact high-speed filter apparatus can be accomplished, and a plurality of the high-speed filter vessels are provided to reduce an amount of wash water to be used at one time, thereby the thickness of the common treated water vessel can be made thin. Further, the rainwater inflow channel preferably distributes the rainwater as a spontaneous falling flow into the rainwater inflow portions of the respective high-speed filter vessels via inflow weirs of the channel so that variations in the water amount may be coped with.

According to a method for back washing the rainwater-treating apparatus and the sewer system in the combined sewer system, back washing is effected with respect to any high-speed filter vessel in the rainwater-treating apparatus which filter vessel increased its preset pressure loss by flowing downwardly the treated water in the common treated water vessel through the high-speed filtering vessel.

As mentioned above, according to the present invention, the upwardly flowing type high-speed filter vessels are provided through partitioning the first sedimentation basin in the combined flow type sewer-treating plant, and a large amount of the rainwater flowing in during raining is distributed into the vessels through the rainwater inflow channel, so that the rainwater can be filtered at a high speed with the charged floating filter medium. Therefore, even if the rainwater enters in an amount of more than Q or if a large amount of the rainwater enters in an amount exceeding 3Q, a majority of the pollution substances can be removed. Furthermore, since the high-speed filter vessels and so forth are provided through partitioning a part of the existing first sedimentation basins, a space for constructing and installing a new civil equipment is not required to be ensured. As explained below in more detail, the apparatus can be operated in the present invention with almost no maintenance.

BEST MODE TO PRACTICE THE INVENTION

In the following, preferred embodiments of the present invention will be explained.

Figure 1:
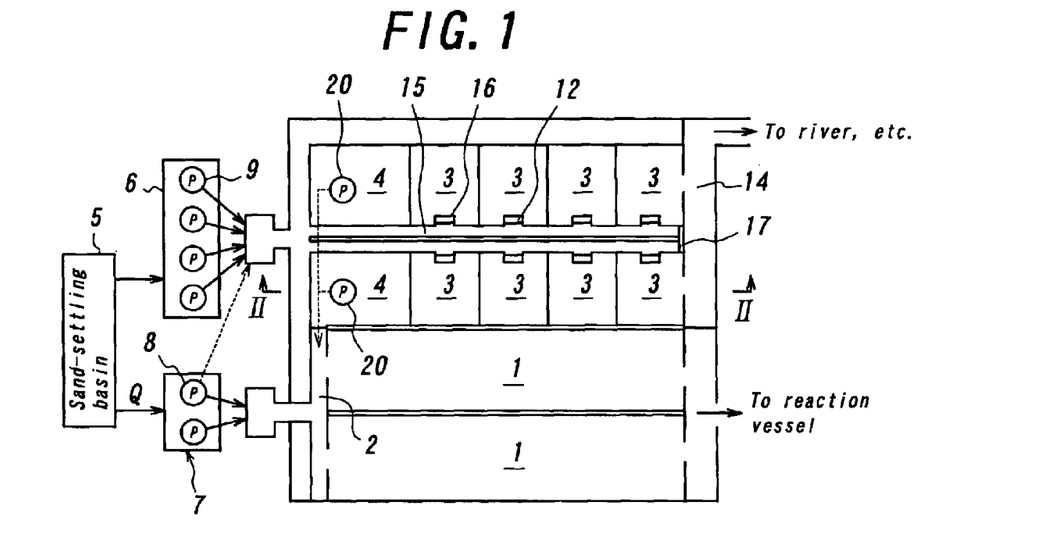
FIG. 1 is a plane view of an embodiment of the rainwater-treating apparatus according to the present invention.
Figure 2:
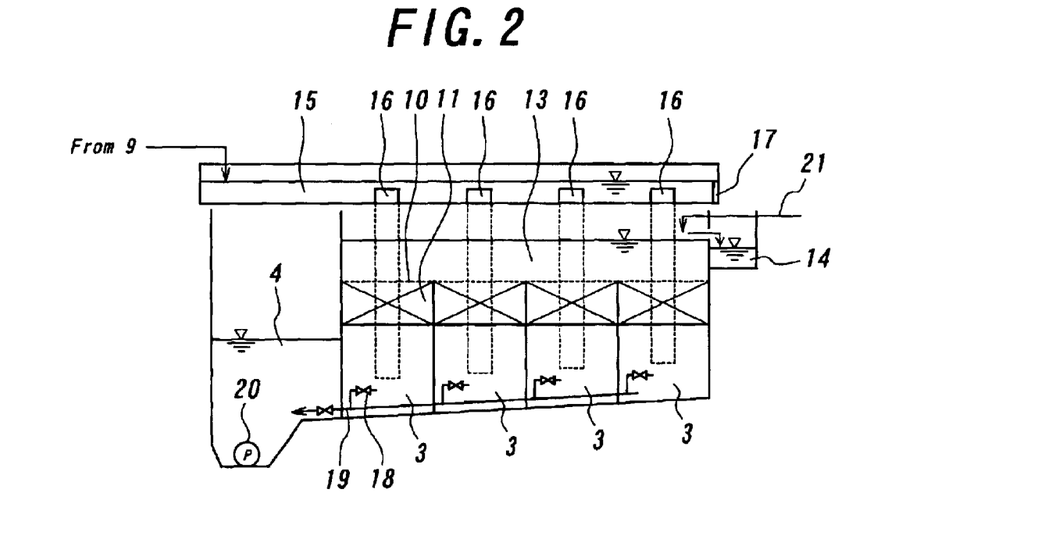
FIG. 2 is a vertically sectional view of FIG. 1.

FIG. 1 is a plane view of the rainwater-treating apparatus according to the present invention, and FIG. 2 is a sectional view of FIG. 1 cut along a line II—II. In this embodiment, a necessary portion of conventional first sedimentation basins 1 provided in the combined flow type sewer-treating plant are left as they are (in the drawings, two rows are used as the first sedimentation basins), a plurality of high-speed filter vessels 3 and used wash water vessels 4 are formed in the remainder (in the drawings, two rows of the high-speed filter vessels and the used wash water vessels). As a result, the water area of the first sedimentation basins 1 decreases as compared with that in the conventional case. However, the smaller water area of the first sedimentation basins 1 is recently sufficient with progress in the sewer-treatment technology as compared with the conventional case. Accordingly, in the combined flow type sewer-treating plants, the treating powers of the first sedimentation basins 1 are often not fully used. Thus, the invention arrangement makes no affect upon the ordinary sewer treatment. It may be said that since the first sedimentation basins receive only up to the maximum sewer amount per hour during non-rainy weather, there is no influence upon the ordinary sewer treatment.

In a left side portion of FIG. 1 are provided a sand-settling basin 5 for receiving sewer and a rainwater vessel 6 and a wastewater vessel 7 into which sewer is distributed from the sand-settling basin, depending upon a design water amount and a rail falling amount. In some sewer-treating plants, the rainwater vessel 6 and the wastewater vessel 7 are combined in the form of a common vessel. Conventionally, entering sewer is entirely received in the sedimentation basin 5, and up to the design water amount 3Q is led to the conventional first sedimentation basins 1 by wastewater pumps 8. Water from which suspended substances (SS) are separated in the first sedimentation basins 1 is led to a downstream reaction vessel where water is treated as conventionally. Since the entering amount of water is not more than Q, the above line only is operated in the same manner as in the conventional case. In the present invention, since the amount of the flowing-in water sometimes exceeds Q during raining, a portion of the water exceeding Q is entirely led to of the high-speed filter vessels 3. Therefore, water feed pipes from the wastewater pumps 8 are modified to be led to the high-speed filter vessels 3, if necessary.

Figure 3:
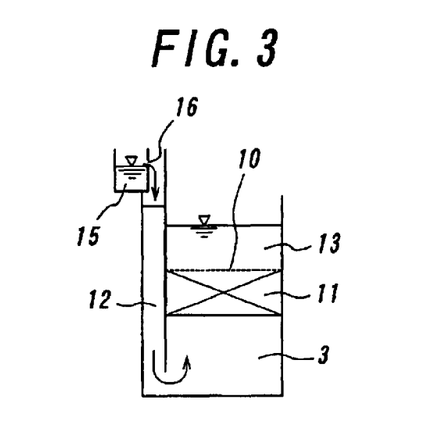
FIG. 3 is a vertically sectional view of a rainwater inflow channel.

The high-speed filter vessel 3 is a filter vessel in which a screen 10 is stretched in a middle portion and a floating filter medium 11 is charged under the screen 10. In this embodiment, totally eight filter vessels are arranged in two rows, but the number of the vessels is arbitrary, although plural is necessary. These high-speed filter vessels 3 are upwardly flowing type filter vessels. As shown in FIG. 3, a vertical rainwater inflow portion 12 is provided for each filter vessel. Rainwater is fed to a lower portion of the vessel through the rainwater inflow portion 12, and inclusions and SS are captured and the treated water discharged upwardly, while the sewer upwardly passes a layer the floating filter medium 11 charged. As shown, a common treated water vessel 13 is provided at upper faces of the high-speed filter vessels. The treated water flows in the treated rainwater channel 14 from an end of the common treated water vessel 13 (from a right end portion in the drawings, and then discharged to a river, etc. In this embodiment, each four filter vessels are connected to a single common treated water vessel 13. Since a simple treated water bypass water discharge path is provided at an outflow portion of the usual first sedimentation basins, the discharge path can be modified into the treated rainwater water channels.

A rainwater inflow channel 15 is provided above the high-speed filter vessels 3 to distribute rainwater into the above-mentioned rainwater inflow portions 12. The rainwater inflow channel 15 is arranged at such a high position to ensure a water level corresponding to a loss water head. For example, inflow weirs of the rainwater inflow channel 15 are set higher than the water surface of the common treated water vessel 13 by around 0.2 to 1 mm. When a first flush treatment is to be effected during raining, the filter loss water head can be set higher within this range. On the other hand, when treatment is effected for a long time period during no rainy weather after raining, it can be set lower in this range. Rainwater is raised into the rainwater inflow channel 15 with the above rainwater pumps 8 and if necessary the wastewater pump 8, and is distributed and spontaneously flown down into the rainwater inflow portions 12 of the high-speed filter vessels 3 via the inflow weirs 16 provided in the rainwater inflow channel 15.

As mentioned above, a portion of the entering water exceeding Q during raining is entirely raised into the rainwater inflow channel 15 by the rainwater pumps 9 and if necessary the pumps 8. The rainwater-treating apparatus according to the present invention can cope with the amount of the entering water largely exceeding 3Q (for example, 5Q to 7Q). However, abnormal huge rainfall may exceed the treating power of the apparatus. In view of this, a rainwater bypass gate 17 is preferably provided in a terminal end, for example of the rainwater inflow channel 15 to overflow excess rainwater. Excess rainwater is flown down into the treated rainwater channel 14, and is discharged directly to the river or the like. The rainwater bypass gate 17 may be preliminarily set at an arbitrary height.

The floating filter medium 11 to be used in the present invention is made preferably of a foamed polymer having an apparent density of 0.1 to 0.4, a 50% compression hardness of not less than 0.1 MPa. As the foamed having such physical properties, polypropylene, polystyrene, polyethylene, etc. may be recited. Among them, closed cell type foamed polyethylene having the foamed degree controlled is preferred from the standpoint of heat resistance, chemical resistance and weather resistance.

If the apparent density of the floating filter medium 11 is less than 0.1, a desirable compression hardness cannot be obtained and the charged layer of the floating filter medium is difficult to swell on back washing. On the other hand, if it is more than 0.4, it is feared that the filter medium may be downwardly flown away on back washing. Further, if the 50% compression hardness is less than 0.1 MPa, the filter medium is compacted on filtering at a high speed, so that a large amount of SS cannot be captured. The 50% compression hardness means a pressure required to crush the filter medium to a half of its height.

The floating filter medium 11 to be used in the present invention is preliminarily constituted by filter medium pieces having sizes of 4 to 10 mm with uneven shapes or cylindrical shapes. The uneven shape means not a simple shape such as cubic or sphere but strange shape having some uneven portions at its outer surface. The floating medium pieces 11 having such uneven shapes have the advantage that they form non-linear large gaps among them, so that a large amount of SS can be captured. Further, the floating filter medium pieces 11 having cylindrical or columnar shapes also have the advantage that they can capture a large amount of SS.

Figure 7:
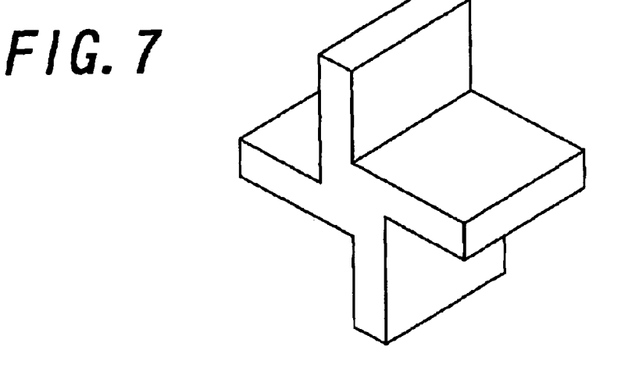
FIG. 7 shows a filter medium piece having four plate-like arms to be used in the present invention.
Figure 8:
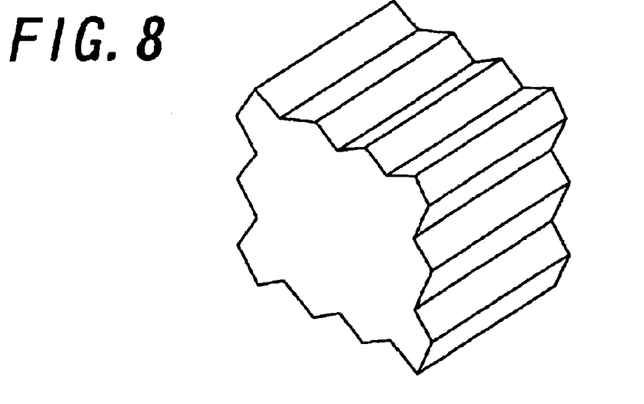
FIG. 8 shows a filter medium piece to be used in the present invention, in which wavy uneven portions are formed around an outer peripheral surface of a planar body having a rectangular sectional shape.
Figure 9:
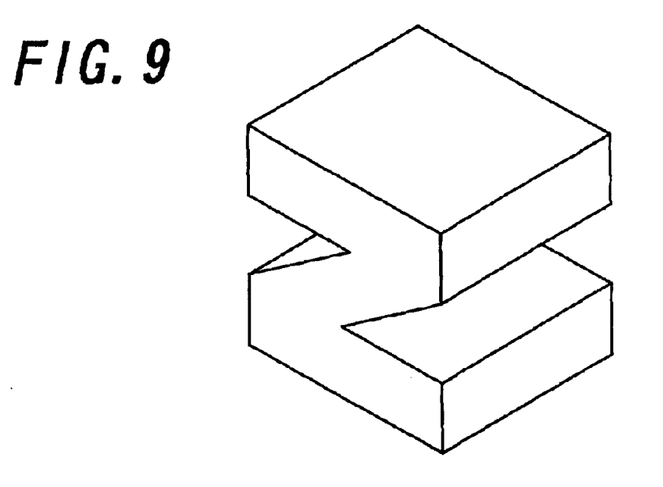
FIG. 9 shows a filter medium piece having a Z-like sectional shape to be used in the present invention.
Figure 10:
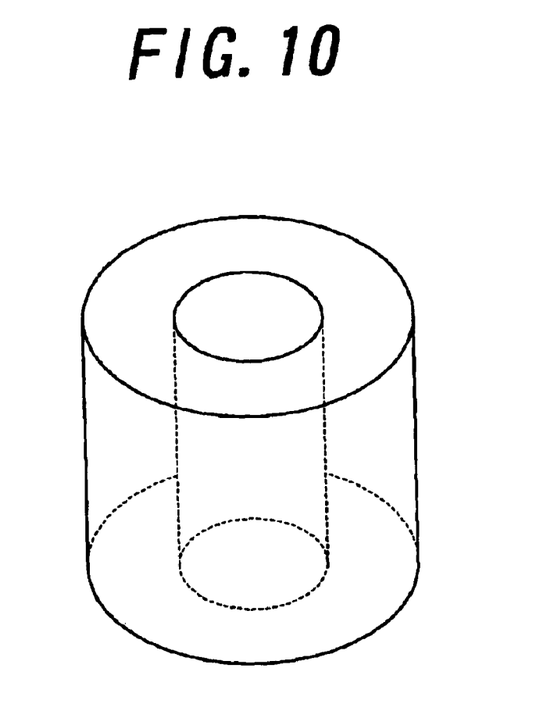
FIG. 10 shows a tubular filter medium piece to be used in the present invention.
Figure 11:
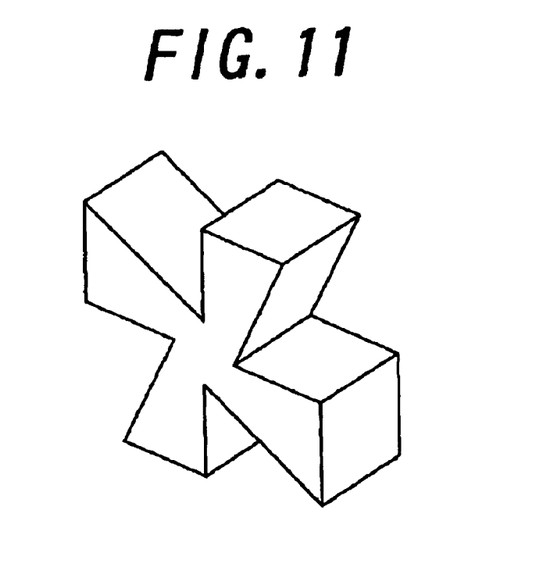
FIG. 11 shows a wind wheel-type filter medium piece to be used in the present invention, formed by modifying the blade portions of FIG. 7.

FIGS. 7 to 11 illustrate filter medium pieces to be used in the present invention by way of example. FIG. 7 shows a filter medium piece having four plate-like arms 9. FIG. 8 shows a filter medium piece in which wavy uneven portions are formed around an outer peripheral surface of a planar body having a rectangular sectional shape. FIG. 9 shows a filter medium piece having a Z-like sectional shape. FIG. 10 shows a tubular filter medium piece. FIG. 11 shows a wind wheel-type filter medium piece formed by modifying the blade portions of FIG. 7.

If the size of the floating filter medium piece 11 is smaller than 4 mm, it is likely to cause clogging, and unsuitable for high-speed filtering. If it is larger than 10 mm, the capturing efficiency of SS decreases. The size in the case of strange-shape floating filter medium piece 11 means the maximum outer diametrical dimension. In addition to the above mentioned floating filter medium pieces 11, spherical filter medium pieces having a smaller apparent density can be charged.

The high-speed filter vessel 3 in which such floating filter medium pieces 11 are charged can capture a large amount of SS, free from compacting of the filter medium, so that a large amount of the rainwater can be treated at high speed. However, as the captured amount of SS increases, the pressure loss increases to decrease the filtering power. This comes to require back washing. Therefore, a used wash water discharge valve 18 is provided in a bottom portion of each high-speed filter vessel 3 so that water in a lower portion of the vessel may be discharged into the used wash water vessel 4 via a used wash water pipe 19. That is, if the used wash water valve 18 of any high-speed filter vessel 3 is opened, treated water inside the upper common treated water vessel 13 downwardly flows back into the high-speed filter vessel 3 having the used wash water valve 18 opened, thereby back washing the charged layer of the filter medium 11. A water discharge pump 20 provided in the used wash water vessel 4 leads the used wash water to a wastewater flow-in channel 22 or into the conventional first sedimentation basins 1, as shown in FIG. 1, where the used wash water is treated. In this embodiment, the used wash water valve 18 is used, but the used wash water may be discharged by a siphon type water discharge path without using the used wash water valve 18.

The high-speed filter vessels 3 in the present apparatus can be washed with a secondary treated water (secondary treated water:water which has been treated in the reaction vessel) in the sewer-treating plant so as to prevent generation of offensive odors on stoppage. For this purpose, a secondary treated water feed pipe 21 is provided to feed the secondary treated water into the common treated water vessel.

In the following, the rainwater-treating method with the rainwater-treating apparatus according to the present invention will be explained together with the back washing method.

First, since the combined amount of the sewer flowing in the sand-settling vessel 5 is not more than Q at the time of non-rainy weather, the entire sewer is led to the conventional first sedimentation basins 1 by the wastewater pumps 8, and it is treated there in the same manner as in the conventional case.

Figure 4:
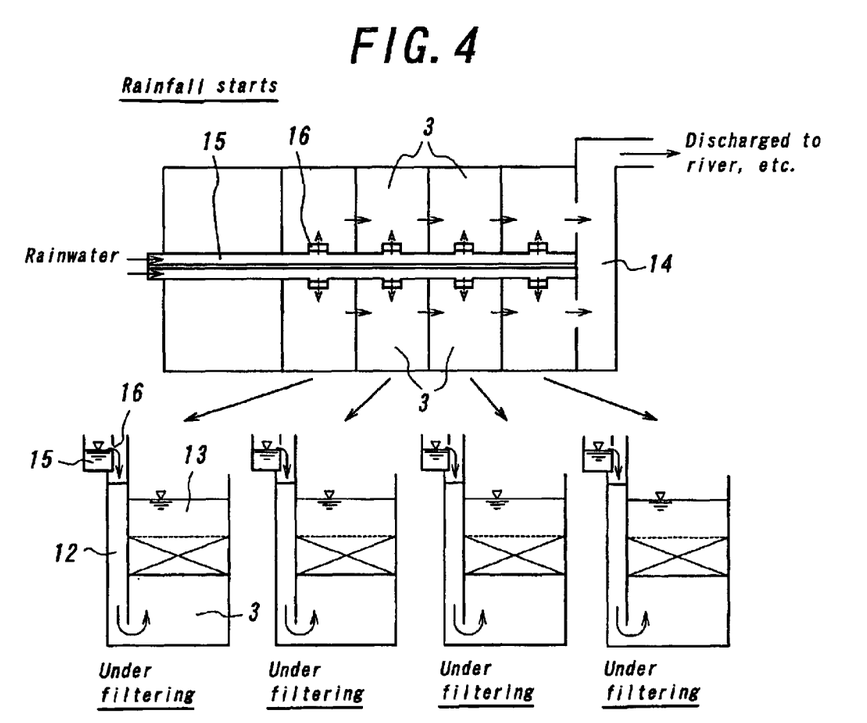
FIG. 4 shows a plane view and sectional views showing the flow of the rainwater when raining starts.

If the combined sewer amount flowing in the sand-settling vessel 5 exceeds the design water amount Q when it starts raining, an excess portion of the rainwater is entirely raised to the rainwater inflow channel 15 by the rainwater pumps 9 and if necessary the wastewater pumps 8. Then, the excess water spontaneously flows down and is distributed into the rainwater inflow portions 12 of the respective high-speed filter vessels 3 via the inflow weirs 16 as shown in FIG. 4. The distributed rainwater once flows down under the filter medium layer, and then upwardly flows and is filtered through the filter medium layer of the high-speed filter vessel 3, and the treated water is discharged to the river, etc. via the common treated water vessel 13 and the treated rainwater channel 14.

As mentioned above, the rainwater-treating apparatus according to the present invention can filter a large amount of the rainwater at a high speed. Even if the amount of rainwater varies, a portion of the water exceeding the design water amount Q can be entirely filtered depending upon variations in the variations in rainwater, unless the amount of entering water abnormally increases. Since the SS removal percentage of the high-speed filter vessel in the present invention is about 70%, a majority of the pollution substances can be removed different from the conventional case even if a large amount of rainwater enters exceeding 3Q.

Figure 5:
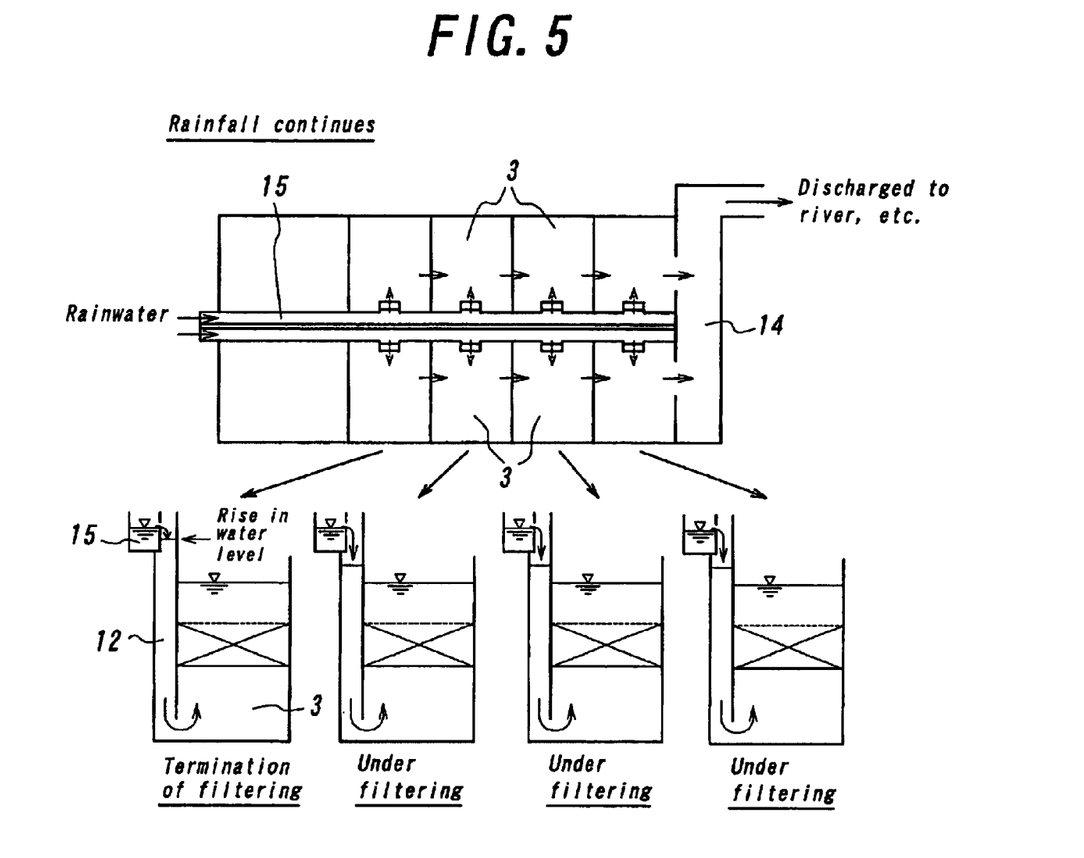
FIG. 5 shows a plane view and sectional views showing the flow of the rainwater when raining continues.

When rainfall continues, the pressure loss of each of the high-speed filter vessels 3 gradually increases. However, such increases usually vary. The pressure loss of each of the high-speed filter vessel 3 can be known from a difference in water level between the common treated water vessel 13 and the rainwater inflow portion. However, since the water level of the common treated water vessel 13 is the same for the filter vessels, increase in pressure loss of each filter vessel can be grasped through increase in the water level of the rainwater inflow portion. FIG. 5 illustrates this state by way of example wherein the pressure loss of the ultra left side increases and the water level of the rainwater inflow portion 12 conspicuously increases as compared with the other vessels. As a result, although the rainwater inflow water level rises near the water level of the rainwater inflow channel 15. At a point of time when the filter medium reaches near a preset pressure loss or the water level of the rainwater inflow portion reaches a preset water level, washing is automatically started.

Figure 6:
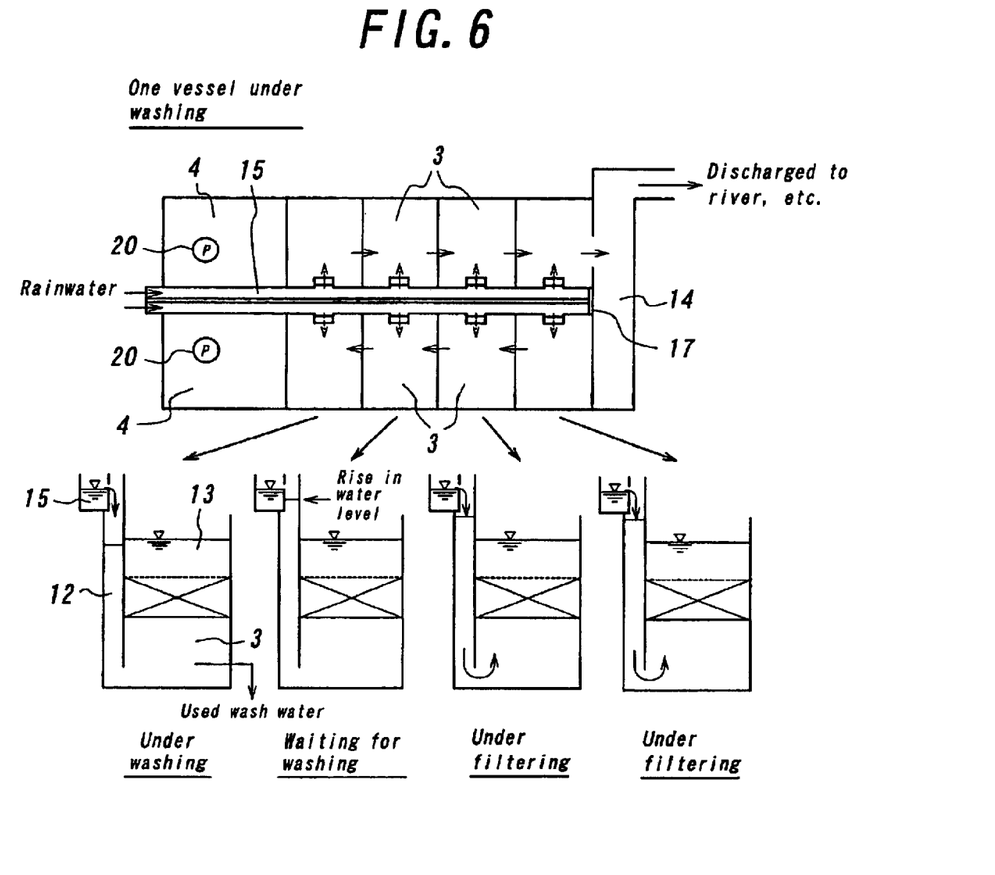
FIG. 6 shows a plane view and sectional views showing the flow of the rainwater when raining continues and a vessel 1 is being back washed.

In this way, when it rains continuously like this, the pressure loss of all the high-speed filter vessels 3 gradually increases and cannot effect filtering sooner or later. The high-speed filter vessels 3 are successively back washed when they reach the pressure loss representing the above-mentioned automatically washing timing. As mentioned above, back washing is effected by opening the used wash water valve 18 in the bottom portion and downwardly flowing the treated water in the common treated water vessel 13. FIG. 6 shows this state in which the ultra left vessel is under back washing. As mentioned above, when the floating filter medium 11 having the apparent density of 0.1 to 0.4 is used for example, the filter medium can be effectively prevented from being discharged together with the back wash water. The back wash water enters the used back wash water vessel 4, and the water discharge pump 20 leads the used wash water to the conventional wastewater inflow channel 2 or the first sedimentation basins 1 for treating it. In this way, back washing is spontaneously effected only by opening the used wash water valve 18 without operating any washing pump, etc. Even during washing, rainwater continuously flows in through the rainwater inflow portion 12, and high-speed filtering is continued in the high-speed filer vessels other than that under washing, so that the treated water is always fed into the common treated water vessel 13. On the other hand, although the time required for back washing one vessel depends upon the thickness of the filter medium, around 1 to 2 minutes are required for the thickness of the filter medium being 0.5 to 1 m.

As shown in FIG. 6, the second vessel from the ultra left vessel, which is under washing, reaches the back washing timing, although unusually. In this case, the second vessel from the left side is waiting for washing until the ultra left vessel finishes washing and the water level of the common treated water vessel 13 reaches a preset level. In such a case, when this vessel continues the treatment, the water level of the rainwater inflow portion 12 may become the same as that of the rainwater inflow channel 15 at the maximum due to further increase in pressure loss. In this case, since the water is treated in this vessel only in an amount corresponding to the pressure loss of the filter medium in this vessel, the moving amount of the water into the rainwater inflow portion from the rainwater inflow channel 15 decreases as compared with that in the other vessels. In this case, the decreased amount of water enters the rainwater inflow portions 12 of the other vessels, and is treated there. Therefore, even if the back wash timing happens to overlap like this, completely no maintenance managing control is effected regarding the operation of introduction of the rainwater. Further, the washing time is around 2 minutes as mentioned above in the present invention, the washing-waiting time causes no actual problem.

As explained above, while the vessels which reach the preset pressure loss level are successively back washed, rainwater is continuously treated. Even if a special flow rate control is not effected, the inflow amounts to the respective high-speed filter vessels 3 are spontaneously adjusted.

Further, when the amount of entering water abnormally increases, excess rainwater is flown down into the rainwater-treating channel 14 from the rainwater bypass gate 17 provided at the terminal end of the rainwater inflow channel 15, and then directly discharged to the river, etc. Since the height of the rainwater bypass gate 17 is preliminarily adjusted, no special operation is unnecessary on raining.

When rainfalling ends and the amount of the entering water decreases, the inflow amount of the rainwater into the high-speed filter vessels 3 spontaneously decreases. However, it is impossible to preliminarily anticipate the timing when the inflow water amount becomes zero, so that the filtration spontaneously ends in the state that the pollution substances stay in the filter media in the high-speed filter vessels 3, although the staying degree varies among the vessels. In this way, completely no water enters the high-speed filter vessels 3 on non-rainy weather. However, if this state is left as it is, offensive odors may be generated from the pollution substances in the filter media. Under the circumstances, the secondary treated water in the sewer-treating plant is fed into the common treated water vessel 13 via the secondary treated water feed pipe 21 so that the high speed filter vessels 3 are separately and successively back washed. When the common treated water 13 reaches a preset water amount with the secondary treated water, the used wash water valve 18 is opened to completely wash an arbitrary one high-speed filter vessel 3. By repeating such steps, all the high-speed filter vessels 3 are completely washed. Since this washing completely washes the filter media with use of the secondary treated water different from the above-mentioned filtration on rainy weather, the high-speed filter vessels wait for next inflow of rainwater As explained above, in the rainwater-treating apparatus in the combined sewer system and the sewer-treating system using this rainwater-treating apparatus according to the present invention, almost all inflow rainwater exceeding Q which has formerly simply treated or not treated can be filtered, which can contributes the environmental clarification of the rivers, etc. Further, since the rainwater-treating apparatus of the present invention can be provided by partitioning the first sedimentation basin in the combined flow type sewer-treating plant, a space for constructing and installing a new civil equipment is advantageously not required to be ensured. Further, the rainwater-treating apparatus according to the present invention is almost free from maintenance, and the flow rate can be spontaneously effected without requiring operation which a worker must do particularly depending upon changes in rain amount during storming. Therefore, since management is easy, and accordingly there is no increase in chemical costs, electric power costs, labor costs, etc. Furthermore, according to the back washing method, each high-speed filter vessel can be back washed by utilizing the treated water in the common treated water vessel without stopping the operation of the entire apparatus, while generation of offensive odors, etc. are completely prevented.

INDUSTRIAL APPLICABILITY

The present invention relates to the rainwater-treating apparatus to be used for treating sewer in the combined sewer system for sewer and storm water and also to the sewer-treating system using this rainwater-treating apparatus. The invention can ensure the treatment of the sewer in the combined sewer systems which have been recently increasing. Thus, the invention has great industrial applicability in contributing the environmental clarification for rivers, etc.

What is claimed is:

1. A rainwater-treating apparatus in a combined storm water and sewage system, said apparatus comprising:
    a plurality of upwardly flowing, high-speed filter vessels each having a layer of a floating filter medium;
    a treated water vessel located above said floating medium layer of the high-speed filter vessels and for collecting treated water from the high-speed filter vessels;
    back washing means for washing the high-speed filter vessels by a downward flow of treated water in said treated water vessel;
    a used wash water vessel for collecting and storing used wash water from said high-speed filter vessels;
    a rainwater inflow channel for continuously distributing rainwater into upper portions of the high speed filter vessels; and
    rainwater inflow portions for causing downward flow of distributed rainwater from the distributed rainwater inflow channel to a position below the floating filter media of the filter vessels.

2. The rainwater-treating apparatus of claim 1, wherein said combined storm water and sewage system comprises a first sedimentation basin, and said rainwater-treating apparatus comprises a first sedimentation basin partitioned to include a second sedimentation basin.

3. The rainwater-treating apparatus of claim 1, further comprising an inflow weir, wherein the rainwater inflow channel is for continuously distributing rainwater as a spontaneous falling flow into the rainwater inflow portion of each of the high-speed filter vessels via the inflow weir.

4. The rainwater-treating apparatus of claim 1, further comprising a rainwater bypass gate located in the rainwater inflow channel for conducting excess rainwater into the rainwater inflow channel so that excess rainwater bypasses the high-speed filter vessels.

5. The rainwater-treating apparatus of claim 1, comprising a secondary treated water feed pipe for feeding secondary treated water in the sewage-treatment system into the treated water vessel during stoppage of the treatment of rainwater.

6. A sewage-treating system in a combined storm water and sewage-system, said sewage-treating system comprising a first sewage-treating section and a second sewage-treating section;
    said first sewage-treating section comprising:
        a sand-settling basin for receiving sewage;
        a first sedimentation basin located downstream of the first sand-settling basin, and
        a reacting vessel located downstream of the first sedimentation basin;
    said second sewage-treating section located downstream of the sand-settling basin and comprising:
        a plurality of upward flow type high-speed filter vessels each having a layer of a floating filter medium;
        a treated water vessel located at upper faces of said high-speed filter vessels and for collecting treated water from the high-speed filter vessels;
        a used wash water vessel for collecting and storing used wash water from said high-speed filter vessels;
        a rainwater inflow channel for continuously distributing entering rainwater into upper portions of the high speed filter vessels; and
        rainwater inflow portions for causing downward flow off rainwater distributed from the rainwater inflow channel to a position below the floating filter media of the filter vessels wherein;
    said sewage-treating system being operative so that, when an amount of sewage to be treated is not more than a preset water amount, such sewage is treated in the first sewage-treating section, whereas when the amount of sewage to be treated is more than the preset water amount, such sewage treatment is treated in the first sewage-treating section and in addition a portion of the sewage exceeding the preset water amount is treated in the second sewage-treating section.

7. The sewage-treating system of claim 6, wherein said second sewage-treating section comprises said first sedimentation basin partitioned to include a second sedimentation basin.

8. The sewage-treating system of claim 6, further comprising an inflow weir, wherein the rainwater inflow channel is for distributing rainwater in a spontaneous falling flow into the rainwater inflow portion of each of the high-speed filter vessels via the inflow weir.

9. The sewage-treating system of claim 6, further comprises a rainwater bypass gate located in the rainwater inflow channel and for conducting excess rainwater into the rainwater inflow channel so that excess rainwater bypasses the high-speed filter vessels.

10. The sewage-treating system of claim 6, further comprises secondary rainwater treated water feed pipe for feeding secondary treated water in the sewage-treatment system into the high-speed filter vessels during stoppage of rainwater treatment.

11. The sewage-treating system of claim 6, wherein said first sedimentation basin is located downstream of the sand settling basin via a first sewage vessel, and the second sewage-treating section is located downstream of the sand-settling basin via a second sewage vessel.

12. The sewage-treating system of claim 11, wherein the first sewage vessel and the second sewage vessel comprise a single sewage vessel.

13. A method for effecting back washing rainwater-treating apparatus in a combined sewage system comprising a plurality of upwardly flowing, high-speed filter vessels each having a layer of a floating filter medium;

a treated water vessel located above said high-speed filter vessels and for collecting treated water from the high-speed filter vessels;

a used wash water vessel for collecting used wash water from said high-speed filter vessels;

a rainwater inflow channel for continuously distributing rainwater into upper portions of the high speed filter vessels; and    rainwater inflow portions for causing downward flow of distributed rainwater from the distributed rainwater inflow channel to a position below the floating filter media of the filter vessels, the method comprising:

back washing the rainwater-treating apparatus with respect to any high-speed filter vessel which exceeds a preset pressure loss by causing downward flow of treated water in the treated water vessel through the high-speed filtering vessel.

14. The method for back washing the rainwater-treating apparatus of claim 13, wherein said back washing said plurality of the high-speed filter vessels comprises:

feeding secondary treated water from the sewage-treating system through the high-speed filter vessels, and    causing downward flow of such secondary treated water into the water treating vessel during stoppage of rainwater treatment.

15. A method for back washing a rainwater-treating system in a combined sewage system comprising a first sewage-treating section and a second sewage-treating section, said first sewage-treating section comprising:

a sand-settling basin for receiving sewage;

a first sedimentation basin located downstream of the sand-settling basin and a reacting vessel located downstream of the first sedimentation basin, said second sewage-treating section located downstream of the sand-settling basin and comprising a plurality of upward flow type high-speed filter vessels each having a layer of a floating filter medium;

a treated water vessel located at upper faces of said high-speed filter vessels and for collecting treated water from the high-speed filter vessels;

a used wash water vessel for collecting used wash water from said high-speed filter vessels;

a rainwater inflow channel for continuously distributing entering rainwater into upper portions of the high speed filter vessels; and    rainwater inflow portions for causing downward flow of rainwater distributed from the rainwater inflow channel to a position below the floating filter media of the filter vessels, wherein    when an amount of sewage to be treated is not more than a preset water amount, such sewage is treated in the first sewage-treating section, whereas when the amount of sewage to be treated is more than the preset water amount, such sewage treatment is treated in the first sewage-treating section and in addition a portion of the sewage exceeding the preset water amount is treated in the second sewage-treating section, the method comprising:

causing downward flow of the treated water in the treated water vessel through the high-speed filtering vessel when any high-speed filter vessel exceeds a preset pressure loss.

16. The method for back washing the rainwater-treating system of claim 15, further comprising:

feeding secondary treated water from the sewage-treating plant through high-speed filter vessels and    causing downward flow of secondary treated water from the sewage-treating system into the treated vessel during stoppage of rainwater treatment.

\* \* \* \* \*